United States Patent
Moody et al.

(10) Patent No.: US 10,859,698 B2
(45) Date of Patent: Dec. 8, 2020

(54) METHOD AND APPARATUS FOR DETECTING FALLING OBJECTS

(71) Applicant: DataGarden, Inc., Morgantown, WV (US)

(72) Inventors: John E Moody, Morgantown, WV (US); Clint Harvey, Morgantown, WV (US)

(73) Assignee: DATAGARDEN, INC., Morgantown, WV (US)

( * ) Notice: Subject to any disclaimer, the term of this patent is extended or adjusted under 35 U.S.C. 154(b) by 346 days.

(21) Appl. No.: 15/847,149

(22) Filed: Dec. 19, 2017

(65) Prior Publication Data

US 2018/0172828 A1    Jun. 21, 2018

Related U.S. Application Data

(60) Provisional application No. 62/436,854, filed on Dec. 20, 2016.

(51) Int. Cl.
 *G01S 17/02* (2020.01)
 *G01S 17/04* (2020.01)
 (Continued)

(52) U.S. Cl.
 CPC ............ *G01S 17/04* (2020.01); *B63C 9/0005* (2013.01); *G01S 7/4802* (2013.01); *G01S 17/42* (2013.01);
 (Continued)

(58) Field of Classification Search
 None
 See application file for complete search history.

(56) References Cited

U.S. PATENT DOCUMENTS

| | | |
|---|---|---|
| 7,335,077 B2 | 2/2008 | Chiappetta |
| 8,384,780 B1 | 2/2013 | Richardson et al. |

(Continued)

FOREIGN PATENT DOCUMENTS

| | | |
|---|---|---|
| EP | 1849703 A2 | 10/2007 |
| EP | 2739525 A1 | 6/2014 |

(Continued)

OTHER PUBLICATIONS

Aishwarya N A, Detection and Removal of Floating Wastes on Water Bodies, 4 pages (Year: 2017).*

(Continued)

*Primary Examiner* — Tung S Lau
(74) *Attorney, Agent, or Firm* — Murphy, Bilak & Homiller, PLLC

(57) ABSTRACT

In an aspect, a processing apparatus receives detection signaling indicating a field incursion in a detection field of a LIDAR device mounted to a marine vessel and oriented to detect objects within a free space alongside the marine vessel. The processing apparatus applies plausibility testing to the field incursion, including determining whether parameters derived from the detection signaling are characteristic of a human body falling from the marine vessel through the detection field. The processing apparatus outputs signaling indicating a person overboard event to an alarm or control system onboard the marine vessel, in response to the field incursion passing the plausibility testing.

10 Claims, 12 Drawing Sheets

(51) Int. Cl.
*G01S 17/42* (2006.01)
*G08B 21/08* (2006.01)
*B63C 9/00* (2006.01)
*G01S 7/48* (2006.01)
*G01S 17/58* (2006.01)
*G01S 17/88* (2006.01)
*G06K 9/40* (2006.01)
*G06K 9/00* (2006.01)
*B63B 79/00* (2020.01)

(52) U.S. Cl.
CPC ............. *G01S 17/58* (2013.01); *G01S 17/88* (2013.01); *G06K 9/00362* (2013.01); *G06K 9/00771* (2013.01); *G06K 9/40* (2013.01); *G08B 21/086* (2013.01); *B63B 79/00* (2020.01)

(56) References Cited

U.S. PATENT DOCUMENTS

| | | | |
|---|---|---|---|
| 8,810,436 B2 | 8/2014 | Zagami et al. | |
| 2011/0037970 A1* | 2/2011 | Rogers | G01P 5/26 356/28 |
| 2012/0229282 A1 | 9/2012 | Zagami et al. | |
| 2015/0279887 A1* | 10/2015 | Uematsu | H01L 27/1462 257/432 |
| 2016/0084959 A1* | 3/2016 | Shirai | G01S 17/88 4/623 |
| 2016/0214534 A1 | 7/2016 | Teich et al. | |
| 2019/0050732 A1* | 2/2019 | Anderson | G06N 3/04 |

FOREIGN PATENT DOCUMENTS

| | | |
|---|---|---|
| WO | 2008031880 A2 | 3/2008 |
| WO | 2013021183 A1 | 2/2013 |

OTHER PUBLICATIONS

FalinWu, Development of a Wearable-Sensor-Based Fall Detection System, 12 pages, (Year: 2015).*
Yueng Santiago Delahoz, Survey on Fall Detection and Fall Prevention Using Wearable and External Sensors, 37 pages, (Year: 2014).*
ABC News Report, 2014, pp. 1-2.
Invizeon Company Overview, pp. 1-6.
"Cruise Vessel Security and Safety Act of 2010", H.R. 3360, One Hundred Eleventh Congress of the United States of America at the Second Session, Jan. 5, 2010, pp. 1-10.
"Man Overboard Detection", PureTech Systems, Dec. 5, 2016, pp. 1-3.
Unknown, Author, "Cruise Overboards: Questions and Answers", http://www.cruisecritic.com/news/news.cfm?ID-5677, Jan. 9, 2014, pp. 1-4.
Unknown, Author, "Status of Overboard Detection Technology for Cruise Vessels", Federal Register, vol. 81, No. 144, Jul. 27, 2016, pp. 1-2.
Unknown, Author, "Status of Overboard Detection Technology for Cruise Vessels", Surveillance International, LLC Response to Docket US C G-2016-0492, Oct. 25, 2016, pp. 1-6.
Van Den Heuvel, Johan C. et al., "Search-Lidar Demonstator for Detection of Small Sea-Surface Targets", Laser Radar Technology and Applications XIII, edited by Monte D. Turner, Gary W. Kamerman, Proc. of SPIE vol. 6950, 69500W, 2008, pp. 1-11.

* cited by examiner

METHOD AND APPARATUS FOR DETECTING FALLING OBJECTS

CROSS-REFERENCE TO RELATED APPLICATIONS

This application claims priority to and benefit of U.S. Provisional Application No. 62/436,854, filed Dec. 20, 2016, the contents of which are incorporated herein by reference in their entirety.

TECHNICAL FIELD

The present invention generally relates object detection, and particularly relates to detecting object incursions corresponding to falling objects, or at least corresponding to falling objects of a certain type or class.

BACKGROUND

A light detection and ranging (LIDAR) device can be used for object detection. LIDAR devices emit light and then detect objects based on the return reflections of the emitted light. The detection area or volume covered by the emitted light, subject to limitations on the detection range, may be referred to as the detection field of the LIDAR device. In a common configuration, a LIDAR device uses a rotating or oscillating laser emitter to emit pulsed laser light over some range of scanning angles. The detection field in such a configuration is planar. Other LIDAR configurations provide volumetric detection fields, e.g., by scanning over a defined range of angles in two dimensions.

LIDAR devices are used in a wide variety of object-detection applications, including machine guarding, area monitoring, and autonomous vehicle guidance. LIDAR devices can also be used for falling object detection, as part of an overall man overboard (MOB) detection system. However, the detection of falling objects suffers from the "false positives" phenomenon.

There are considerable human and economic interests involved in robustly detecting legitimate MOB events, while simultaneously avoiding false alarms. LIDAR technology for MOB brings with it both advantages and disadvantages. While LIDAR devices offer good detection resolution and operate without the need for ambient light, they also tend to see anything and everything over some minimum object size and reflectivity. That characteristic leads to an unacceptable number of false positives in the MOB context, because various types of objects may enter the detection field. For example, various objects may enter the free space around the perimeter of a large cruise liner, including waves, birds, smaller ships or structures. Further, various items may fall from the ship, such as trash, articles of clothing or other personal belongings of the passengers onboard.

SUMMARY

Embodiments of the present invention provide an improved method of detecting falling objects. In one aspect, the methods and apparatuses disclosed herein use one or more of sophisticated filtering, volumetric scanning, and improved detection field configurations, to provide robust detection of falling objects while greatly reducing the number of false positives associated with past approaches to falling object detection. Consequently, while not limited to such applications, the methods and apparatuses disclosed herein provide advantageous detection of a person falling overboard from a marine vessel, such as a passenger falling from a large commercial cruise ship.

According to some embodiments, a method performed by a processing apparatus includes receiving detection signaling indicating a field incursion in a detection field of a LIDAR device. The LIDAR device is mounted to a marine vessel and oriented to detect objects within a free space alongside the marine vessel. The method further includes applying plausibility testing to the field incursion, including determining whether parameters, also referred to as detection metrics, derived from the detection signaling are characteristic of a human body falling from the marine vessel through the detection field. The method also includes outputting signaling indicating a person overboard event to an alarm or control system onboard the marine vessel, in response to the field incursion passing the plausibility testing.

According to some embodiments, a processing apparatus includes interface circuitry configured to receive detection signaling indicating a field incursion in a detection field of a LIDAR device. The LIDAR device is mounted to a marine vessel and oriented to detect objects within a free space alongside the marine vessel. The processing apparatus also includes processing circuitry operatively associated with the interface circuitry and configured to apply plausibility testing to the field incursion, including determining whether parameters derived from the detection signaling are characteristic of a human body falling from the marine vessel through the detection field. The processing circuitry is also configured to output signaling indicating a person overboard event to an alarm or control system onboard the marine vessel, in response to the field incursion passing the plausibility testing.

Of course, the present invention is not limited to the above features and advantages. Those of ordinary skill in the art will recognize additional features and advantages upon reading the following detailed description, and upon viewing the accompanying drawings.

DETAILED DESCRIPTION

Embodiments of the present invention provide improved methods of detecting falling objects, including detecting whether a human body is falling from a marine vessel, such as a commercial cruise ship. These methods include techniques that can be used to discriminate between a human body falling and other objects that may enter the free space around the marine vessel, such as clothing, trash, birds, waves, or other structures. Objects may be detected using LIDAR technologies that use planar or volumetric detection fields. In some cases, LIDAR may be used in combination with other single-plane and volumetric technologies (e.g., RADAR, SONAR, etc.).

Figure 1:
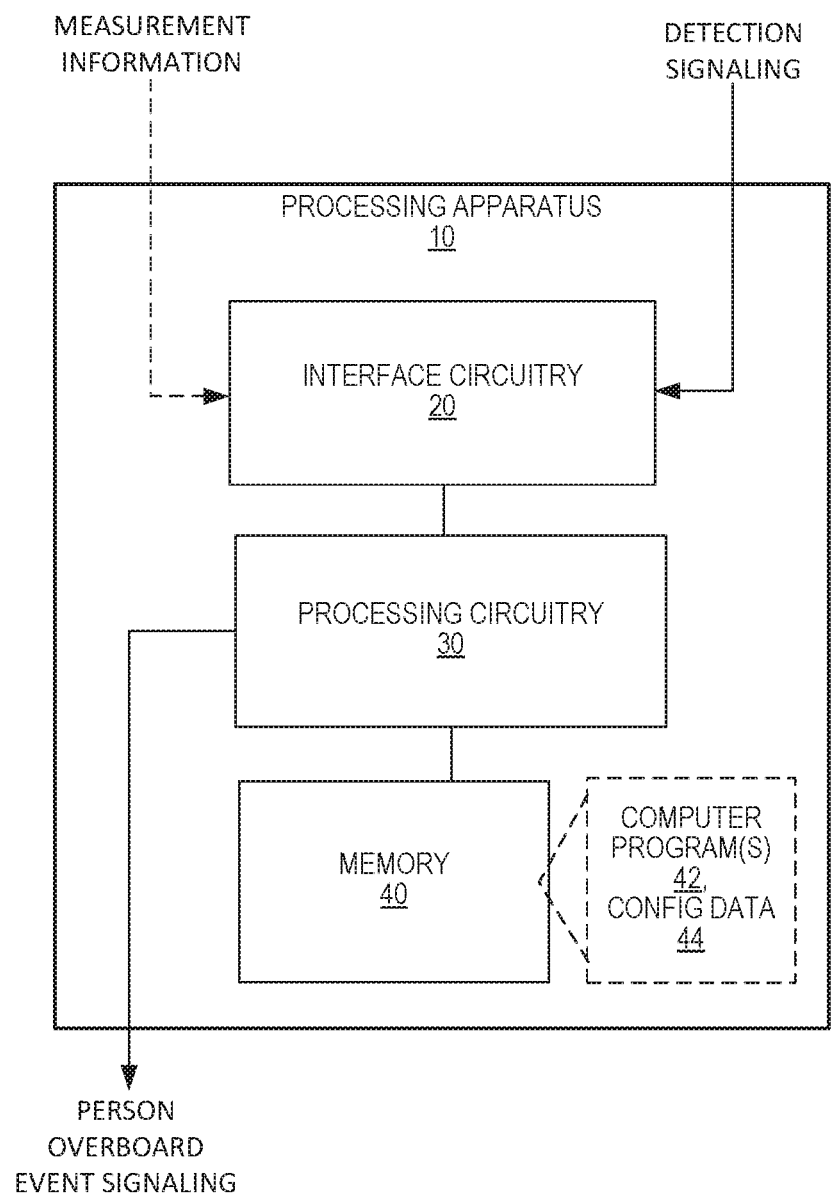
FIG. 1 illustrates a processing apparatus for falling body detection, according to some embodiments.

FIG. 1 illustrates a processing apparatus 10 that works in combination with an object detection device to determine if a certain type or class of object is passing through a detection field of the objection detection device. According to some embodiments, the object detection device is a LIDAR device mounted to a marine vessel and oriented to detect objects within a free space alongside the marine vessel. The processing apparatus 10 is configured to determine if an incursion into the detection field of the LIDAR device is caused by a human body falling from the marine vessel through the detection field.

The processing apparatus 10 includes interface circuitry 20 configured to receive detection signaling indicating a field incursion in the detection field of the LIDAR device. The interface circuitry 20 includes circuitry for wired communication and/or transceiver circuitry and one or more antennas for wireless communication. The interface circuitry 20 may include transmitter circuits, receiver circuits, and associated control circuits that are collectively configured to transmit and receive wired or wireless signals according to known communication technologies. In at least one configuration, the interface circuitry 20 comprises an RS-422 or Ethernet interface, or other data interface, for communicating with a LIDAR device, or for communicating with an intermediary computer or apparatus that provides the detection signaling based on receiving output data from a LIDAR device.

The processing apparatus 10 also includes processing circuitry 30 configured to apply plausibility testing to the field incursion. This includes determining whether parameters derived from the detection signaling are characteristic of a human body falling from the marine vessel through the detection field. The processing circuitry 30 is also configured to output, via the interface circuitry 20, signaling indicating a person overboard event to an alarm or control system onboard the marine vessel, in response to the field incursion passing the plausibility testing.

The processing circuitry 30 includes one or more digital processing circuits, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 30 may comprise fixed circuitry, or programmable circuitry that is specially adapted via the execution of program instructions implementing the functionality taught herein, or may comprise some mix of fixed and programmed circuitry.

The processing apparatus 10 also includes a memory 40. The memory 40, in some embodiments, stores one or more computer programs 42 and, optionally, configuration data 44. The memory 40 provides non-transitory storage for the computer program 42 and it may comprise one or more types of computer-readable media, such as disk storage, solid-state memory storage, or any mix thereof. The memory 40 may be in the processing circuitry 30 and/or separate from processing circuitry 30.

Figure 2:
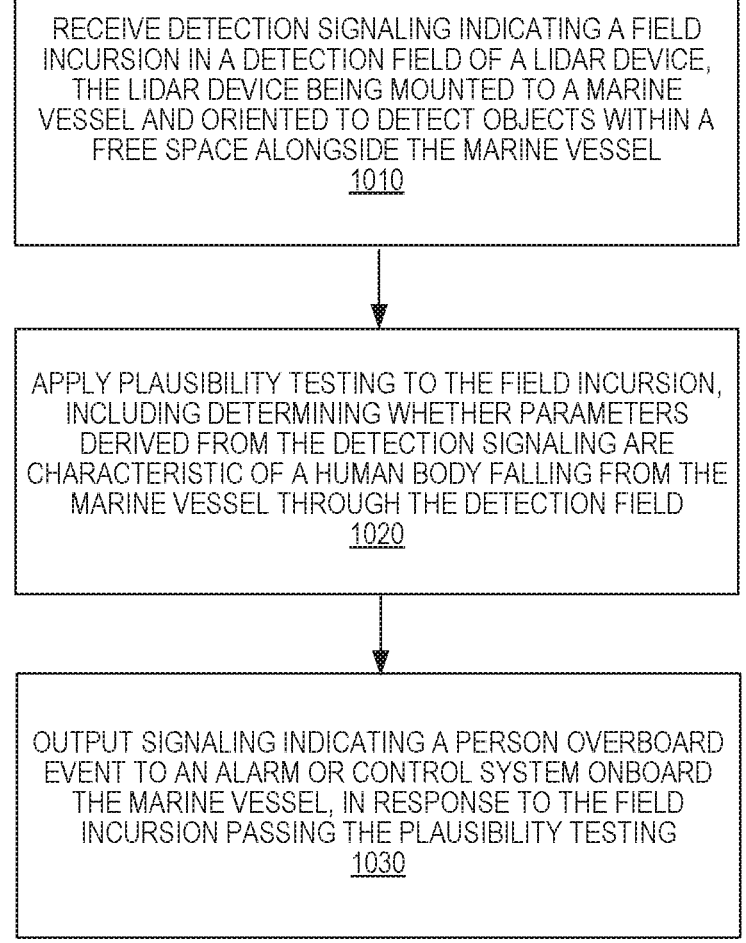
FIG. 2 illustrates a flowchart for a method of falling body detection, according to some embodiments.

In some embodiments, the processing circuitry 30 may execute a computer program 42 stored in the memory 40 that configures the processing circuitry 30 of the processing apparatus 10 to perform one or more of the methods described herein. One of these methods is illustrated by the flowchart 1000 of FIG. 2.

The method 1000 includes receiving detection signaling indicating a field incursion in a detection field of a LIDAR device (block 1010), where the LIDAR device is mounted to a marine vessel and oriented to detect objects within a free space alongside the marine vessel. The method 1000 also includes applying plausibility testing to the field incursion, including determining whether parameters derived from the detection signaling are characteristic of a human body falling from the marine vessel through the detection field (block 1020). The method 1000 further includes outputting signaling indicating a person overboard event to an alarm or control system onboard the marine vessel, in response to the field incursion passing the plausibility testing (block 1030).

In one or more embodiments, determining whether the parameters are characteristic of a human body falling from the marine vessel through the detection field comprises determining whether the parameters fall within configured ranges that are plausible for a human body falling from the marine vessel through the detection field. This may include, before determining whether the parameters fall within the configured ranges, compensating the parameters for motion of the marine vessel coincident with the field incursion and/or compensating the configured ranges for motion of the marine vessel coincident with the field incursion.

In an example case, the marine vessel may pitch or roll in a manner that increases or decreases the apparent velocity of an object falling in free space alongside the vessel. Compensating for the "sea state" (vessel motion relevant to the parameter(s) being determined from the detection signaling) represents an attempt to null, or at least reduce, the relativistic effects of the vessel motion. Thus, when attempting to determine whether the velocity of a falling object, as derived from the detection signaling indicating the field incursion, is plausible for a human being falling from the marine vessel through the detection field, the processing apparatus 10 may treat its initial calculation of the velocity parameter as a raw or uncompensated value, and then adjust it upward or downward as a function of the relative motion of the marine vessel, to obtain a compensated velocity parameter.

Alternatively, rather than adjusting the observed velocity of the falling object, the processing apparatus 10 may adjust the range or ranges of velocity values that are considered plausible for a human being falling from the marine vessel through the detection field. For example, the configuration data 44 may include one or more configured ranges of plausible velocities, e.g., calculated based on possible points of egress from the marine vessel that are relevant to the positioning of the detection field alongside the vessel, where these ranges assume a steady, level state for the marine vessel. The ranges could be increased or decreased for use in evaluating the observed velocity, to compensate for relative motion of the vessel. For example, the rate of roll of the vessel can be used to determine the extent to which the observed velocity of the falling object is greater or lesser than its actual velocity, which is another way of saying that the motion of the vessel relative to the falling object is compensated for in the plausibility testing.

The measurement information may be received directly or indirectly from one or more sensors onboard the marine vessel, where the measurement information indicates motion of the marine vessel for at least the time corresponding to the field incursion.

The parameters may be derived from the detection signaling, and the parameters may be changed to account for the motion of the marine vessel relative to a falling object assumed to be responsible for the field incursion.

For example, the parameters may include a falling-object position, a falling-object speed or velocity, and/or falling-object acceleration derived from the detection signaling, such that compensating the parameters includes changing the falling-object position, the falling-object speed or velocity, and/or the falling-object acceleration to account for the motion of the marine vessel relative to a falling object assumed to be responsible for the field incursion.

The parameters may include an object velocity derived from the detection signaling, such that determining whether the parameters are characteristic of a human body falling from the marine vessel through the detection field includes determining whether the object velocity is plausible for a human body falling from the marine vessel through the detection field.

The parameters may also comprise a detected or computed object path over time, as derived from the detection signaling, such that determining whether the parameters are characteristic of a human body falling from the marine vessel through the detection field includes determining whether the object path is plausible for a human body falling from the marine vessel through the detection field.

In at least one embodiment, the detection signaling indicates a position of the field incursion, i.e., a position of the object as detected by the LIDAR device within the detection field. In at least some detection field configurations, e.g., inclined planar fields or multi-planar or other volumetric fields, the detection signaling may constitute multiple detections of the object as it moves in or through the detection field. Thus, the detection signaling in one or more embodiments indicates object position at respective times, and, in at least one embodiment, the parameters are derived from the detected positions and times. Here, position may be expressed in coordinates referenced to the LIDAR device, or may be expressed according to a coordinate transformation.

In either case, as an example, the detected positions and times are used to derive at least one of the object's path, velocity, and acceleration. Correspondingly, plausibility testing may comprise determining whether the object's path is plausible for a human body falling from the marine vessel through the detection field and/or determining whether the velocity or acceleration are plausible. The assessment of "plausibility" comprises, for example, comparing the variable of interest, e.g., path, velocity, etc., to a configured numeric value or range of values, that define what it characteristic or possible for persons falling from the marine vessel through the detection field.

The configured value(s) in at least some embodiments account for the particulars of the marine vessel in relation to the orientation and shape of the detection field, e.g., by considering the possible points of egress and their respective heights and/or offsets relative to the detection field. In any case, in at least one embodiment, the detection signaling is used to determine a ballistic trajectory of the object responsible for a field incursion, e.g., by tracking the object as it falls or moves through or in the detection field based on determining its changing spatial location over known time instants. In turn, the plausibility of the ballistic trajectory is evaluated, e.g., against a range or family of ballistic trajectory that are characteristic or possible for persons falling from the marine vessel through the detection field.

As indicated by the embodiments described above, object detections (detection field incursions) from a planar or volumetric LIDAR device are filtered using one or more plausibility tests to discriminate between field incursions that are plausibly a human body falling through the detection field and field incursions that are not plausibly a human body falling through the detection field (e.g., clothing, trash, birds). This discrimination is based on detection signaling directly from the LIDAR device or detection signal derived from the output signaling (field monitoring signaling) from the LIDAR device. The processing apparatus 10 may require a minimum amount of data to detect falling human bodies among field incursions. This data may include a time of each field incursion and a location of each field incursion. Other necessary data can include a size of the detected object.

In some cases, the detection field may be oriented to provide improved detection and discrimination, for both single planar and volumetric scanning. Other improvements may involve multi-planar and volumetric scanning techniques that involve a ballistic curve fit, acceleration, etc. Such techniques are discussed further below.

Field Incursion Filtering

Field incursion filtering is the process or operation of discriminating field incursions of interest (e.g., falling bodies) from those not of interest (e.g., birds). This filtering is applicable to both single plane, multi-plane and volumetric scanning, and it can be understood as an example embodiment of the plausibility testing contemplated herein for the advantageous reduction of false-positive detections of person overboard events.

On a ship, for example, a field incursion of interest is a human body falling, while examples of field incursions that are not of interest might include a bird, a chair, or a towel. Other types of incursion caused by non-falling objects include a gangway, a tarp blowing in the wind, a wave, or a passenger waving their arms. Because of these potential incursions that are not a human body falling, relying solely on the LIDAR notifications of field incursions leads to many false positives—i.e., false detection of a person falling overboard.

To reduce the false positives, this filtering is performed by plausibility testing. Plausibility testing in one or more embodiments uses current data, and possibly future or historical data, to determine the plausibility of a field incursion being an actual falling body of interest rather than noise generated from other environmental detections. Plausibility testing considers, for example, the time, location, and frequency of incursions.

The following are some examples of field incursions that may occur on or around a ship and how field incursion filtering is applied by plausibility tests. One scenario involves birds dropping though a detection field. To appreciate the value of plausibility testing, assume that an object passes through the detection field and results in the processing apparatus 10 receiving detection signaling indicating the field incursion. Further, assume that the size and velocity parameters associated with the field incursion fall into configured size and velocity ranges that are characteristic of a human body falling from the marine vessel through the detection field. For example, the size and velocity parameters are provided to the processing apparatus 10 directly in the detection signaling, or the processing apparatus 10 is configured to derive the size and velocity parameters from the detection signaling. Again, the configured size and velocity ranges may be held as stored data (e.g., the configuration data 44) in the processing apparatus 10.

Facially, the size and velocity parameters indicate that the field incursion could correspond to a human being falling through the detection field. However, in at least one embodiment, the processing apparatus 10 evaluates the plausibility of the field incursion being a person overboard event by applying temporo-spatial filtering to its processing of field incursions. For example, a plausibility test may look forward and backwards in time, such that if more than a configured number of field incursions in a configured radius within the current incursion occur, the incursion fails the plausibility test.

For birds, it is normal to have multiple birds dive through a detection plane in a short time frame in an area with a radius of six feet. Therefore, when applying a plausibility test to eliminate incursions by birds, the filter looks forward (by waiting until a forward window has expired before processing the incursion) and backwards in time for, e.g., two seconds, counting the number of incursions within the circle defined by the six-foot radius. If the count is exceeded, the field incursion fails the plausibility test, because a falling human body does not generate this type of incursion pattern, whereas birds do. Note that rather than using a radius-based spatial filter, the filter can be volumetric for a three-dimensional detection field.

Notably, a person could become separated from an object falling with them (e.g., a hat or a shoe). Even though such objects are unlikely to be picked up as being a relevant size, it is still possible for multiple incursions to occur when a human being falls through the detection field. To prevent temporo-spatial filtering from missing such events, a minimum window on the time between incursions is utilized, in at least one embodiment of the processing apparatus and associated detection method.

That is, at bottom, temporo-spatial filtering rejects a field incursion event as implausible (not a person falling through the detection field) if more than some threshold (configured) number of field incursions occur in temporal and spatial proximity to the field incursion event being tested for plausibility. However, the temporo-spatial filtering in at least one embodiment uses an intelligent qualifier that reduces the chance that temporo-spatial filtering will cause an actual person overboard event to be rejected as implausible. Specifically, the temporo-spatial filtering in one or more embodiments is adjusted in recognition of the fact that one or more objects may fall along with but separately from a person falling overboard from the marine vessel. For example, a hat or a shoe may become separated from the person and fall along with the person. These related objects typically enter the detection field at about the same time as the falling person, and typically enter the detection field in roughly the same area or location.

Therefore, in at least one embodiment of the temporo-spatial filtering applied by the processing apparatus as a plausibility test to a field incursion, the temporo-spatial filtering does not "count" field incursions occurring within the area or volume of interest in the detection field, within a narrow time window around the field incursion being tested for plausibility. For example, the temporo-spatial filtering ignores other field incursions in the same area or volume of interest that occur within a 40 millisecond (ms) window of the field incursion being tested for plausibility. In a further extension of this "blanking" approach, the temporo-spatial filtering ignore such incursions only when the object size parameter associated with such other incursions is smaller than a configured threshold, or otherwise falls into one or more configured size ranges that are characteristic of articles of clothing or other paraphernalia.

On the other hand, the temporo-spatial filtering counts events that are within the configured proximity (e.g., a six-foot radius) and are greater than the blanking time window (e.g., 40 ms), but within the plausibility testing time window (e.g., within two seconds of the occurrence of the event under test). Thus, if a shoe, hat, or other article of clothing becomes separated from a person as the person falls from the marine vessel, the processing apparatus 10 will likely see multiple field incursions occurring within close temporal and spatial proximity to one another. However, assuming that a size parameter is used, plausibility testing on the size parameters associated with the multiple, coincident field incursions allows the processing apparatus 10 to identify the field incursion associated with the person, and the above-described temporo-spatial filtering prevents the clothing or other paraphernalia falling along with the person from causing the processing apparatus 10 to disqualify the person's field incursion as being implausible.

This type of filtering, which is associated with counting events occurring in physical proximity to each other with a minimum and maximum distance and within a time window with a minimum and maximum time, can be configured to fit many scenarios. Such filtering can also be applied sequentially, providing the capability to apply multiple tests on a single incursion.

Broadly, in at least some embodiments herein, applying plausibility testing to a field incursion includes applying a temporo-spatial filtering test to determine whether the field incursion is distinct. The temporo-spatial filtering test includes determining, for a defined time window around a detection time of the field incursion, the number of other field incursions detected within a configured area or volume around a location of the field incursion in the detection field. The field incursion passes the temporo-spatial filtering test if the number is less than a configured number, and otherwise fails the temporo-spatial filtering test. Again, the temporo-spatial filtering may be configured not to count field incursions that occur in the involved area or region of the detection field within a narrow, sub-window of time around the field incursion being assessed for plausibility, to account for the possibility of loose items, clothing, etc., falling along with a person.

Additionally, these types of filters may be applied to specific areas within the detection field and at specific times, based on known behaviors. For example, one such location may be onboard a ship in an area where birds are a problem, due to passengers feeding them. From this location, more aggressive parameters may be set to filter behaviors associated with flocking birds. In an area where a gangplank will be connected while in port, a filter may be tailored to allow the processing apparatus 10 to filter the associated incursion.

Furthermore, secondary information not related to information directly obtained from the LIDAR device or devices, such as a GPS location or a vessel speed, may be utilized to select different filters and associated parameters. For example, a ship several miles out to sea is unlikely to have incursions associated with birds. The knowledge of ship location allows for the reduction in filter sensitivity associated with bird incursions while maintaining an acceptable false positive rate.

Overall, all filters can be customized for particular LIDAR devices and particular areas within the LIDAR device's detection field. This customization may include configured ranges for certain parameters. Filters can be tuned through altering filter parameters based on secondary data. Filters can also be disabled/enabled based on secondary data, and applied sequentially to discriminate between falling bodies of interest and field incursions that are not of interest.

LIDAR Falling Body Detection System

Figure 3:
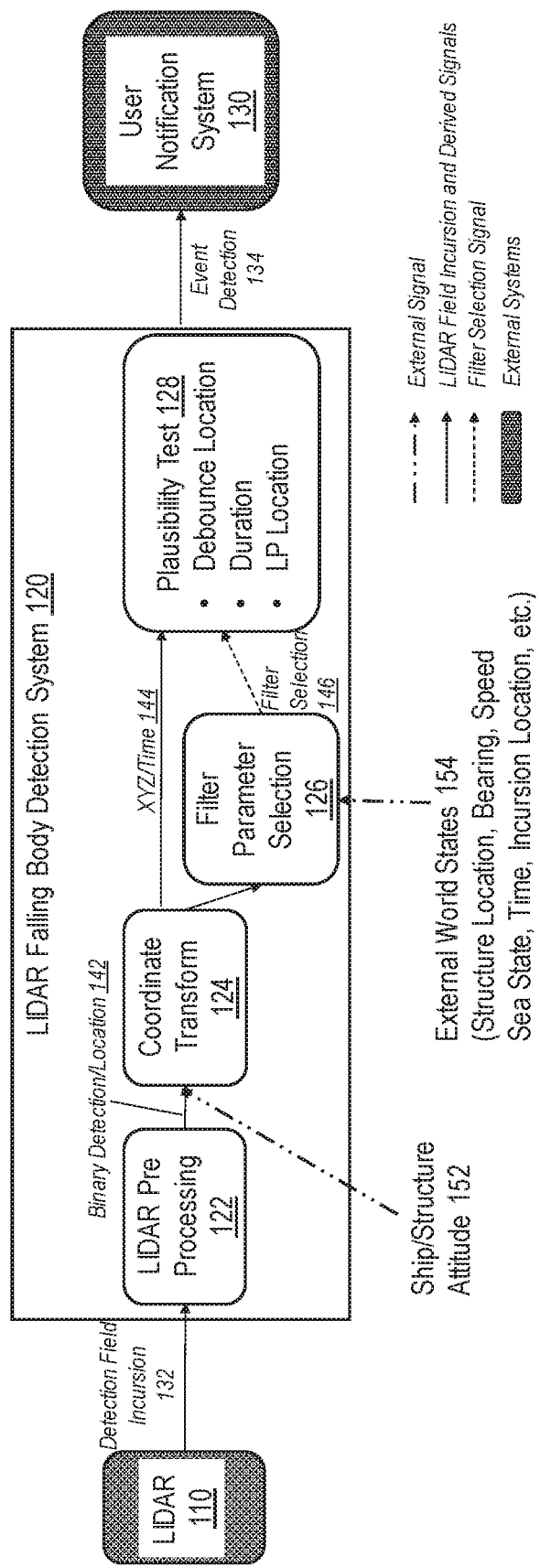
FIG. 3 illustrates a LIDAR-based falling body detection system, according to some embodiments.

FIG. 3 illustrates one example of a filtering approach for a LIDAR Falling Body Detection System (LFBDS) 120, according to some embodiments. LIDAR signaling information, such as a sensory or detection field incursion signal 132, is received into the detection system from a LIDAR device 110. The signal 132 into the LFBDS 120 causes a LIDAR Pre-Processing element (or module) 122 to convert the incoming signal 132 to a normalized signal, or a binary detection/location (Binary Det/Loc) signal 142 for further processing. The LIDAR Pre-Processing element 122 accepts the signal 132 transmitted from the LIDAR device 110 to the LFBDS 120, where the signal 132 is formatted and/or encoded based on the LIDAR manufacturer's specifications and the LIDAR device configuration. The manufacturer-encoded signal 132 may contain a simple notification of a detection field incursion (binary signal), indicating either the start of an incursion, the associated time or the stop of an incursion, and the associated time. The time may be provided by polling of the device or supplied by the device itself, as part of the signal 132.

The signal 132 may be a simple notification of a detection field incursion, along with other information such as size, location, etc. The signal 132 may also be a complex notification of detection field incursion, containing information typically associated with a point cloud detection.

The LIDAR Pre-Processing element 122 converts the manufacturer-encoded signal 132 to the Binary Det/Loc signal 142, which is made up of the incursion state (e.g., true=incursion, false=no incursion), the time of the incursion state change, and metadata at each state change. The signal 142 may include an incursion location relative to the unit and the size of the incursion object. This signal 142 is a normalized signal that can be based on the available information/data format of incursion event signals from multiple LIDAR unit manufacturers. The only required data is the incursion state and the time at which the state change occurs.

The Binary Det/Loc signal 142 is then transmitted from the LIDAR Pre-Processing element 122 to a Coordinate Transform element 124, which causes any location information in the Binary Det/Loc signal 142 to be transformed from the reference frame of the LIDAR device 110 to the reference frame of the structure (e.g., ship). If the alignment of the originating structure (e.g., ship deck) can change significantly as related to the direction of the acceleration of the falling body, the Coordinate Transform element 124 corrects for these changes based on the Ship/Structure Attitude signal 152.

The transformed Binary Det/Loc signal 142, or XYZ/Time signal 144, may be transmitted to a Filter Parameter Selection element 126. This provides information that can be utilized in the selection of the desired filter parameters utilized in the Plausibility Test element 128. Examples of information (both derived from the Binary Det/Loc signal 142 and associated with the state of the external world 154) for selecting the desired plausibility test filter parameters include, but are not limited to: an incursion location; an incursion origination; an incursion time; an incursion duration; a structure location (in the case of moving structures such as a ship); a structure bearing: a structure speed; a sea state (in the case of a structure on a body of water); a structure time: an event schedule; and/or a passenger complement.

The resulting Filter Selection signal 146 is transmitted to the Plausibility Test element 128. The Plausibility Test element 128 executes a series of plausibility tests against the current and past field incursion events associated with XYZ/Time signals 144 that come from the Coordinate Transform element 124. The plausibility testing may be based on a series of configurable plausibility tests, with the configuration parameters determined by the information within the Filter Selection signal 146. A preconfigured number of past events and/or incursions may be stored for later plausibility tests. Each configured plausibility test processing the events produces a signal indicating if the current event passes the plausibility test or fails it. Once a plausibility test fails, the current event is considered not to be of interest (i.e., the possibility that the event represents a human being falling from the marine vessel through the detection field is deemed to be implausible) and no event detection signal is sent to a User Notification System 130. If all relevant plausibility tests produce a result of plausible (i.e., the event is deemed as plausibly representing a person falling from the marine vessel through the detection field), an Event Detection signal 134 is sent to the User Notification System 130.

When storing events and associated XYZ/Time signals 144 for later plausibility testing, two sets of event data are created, a Raw set which includes all events from XYZ/Time signals 144 up to the configured storage limit (with older events removed as new events arrive in a first-in-first-out, FIFO, fashion), and a Filtered set which only includes those events which pass the selected plausibility tests, also stored on a FIFO basis.

In at least one embodiment, the processing apparatus 10 introduced in FIG. 1 comprises the LFBDS 120, e.g., the processing circuitry 30 is configured to implement the processing operations associated with blocks 122, 124, 126, and 128 of the LFBDS 120. In one or more other embodiments, at least the preprocessing associated with block 122 is performed by an intermediary node or system disposed between the LIDAR device 110 and the processing apparatus 10. Further, it should be appreciated that the LFBDS 120 in one or more embodiments is implemented in distributed fashion across two or more on board computer systems.

Plausibility Tests

Plausibility testing may include one or more tests as applied to a field incursion. For example, plausibility testing may include tests for a de-bounce location, a duration and a low pass (LP) location. Plausibility testing may be performed for one or more field incursion "events," which may each include one or more field incursions (e.g., a person and one or more separated items of clothing cause multiple field incursions within a narrow time window and this "set" of field incursions may be treated as one field incursion "event"). Regarding the de-bounce location (Deb Loc) test, parameters adjusting the Deb Loc include: raw/filtered sets of data; a de-bounce time; a minimum duration of a prior event; a location distance minimum; and/or a location distance maximum.

The De-bounce Loc plausibility test, operating on either raw or filtered event sets, looks backward in time up to a maximum time (De-bounce Time) for state changes in the event from true to false (incursion to no incursion). For each of these state changes, the prior state change from false to true (initiation of the incursion event) is found by searching backward in time, providing the start and stop time for the event and allowing for the calculation of the event duration. If the event duration is greater than a configured Minimum Duration of Prior Event, the position of the detected incursion of this event is then compared to the position of the incursion of the current event. If the linear distance between the location of the two events is greater than a configured Location Distance Minimum and less than a configured Location Distance Maximum, the current field incursion event fails the plausibility test. If no prior signal in the selected data set matches the criteria, the field incursion event under test passes the plausibility test. In other words, if an object of an event passes through the detection plane and some other object is within the same relative area in the plane, the event meets the plausibility criteria.

For the Duration test, parameters associated with duration include a Minimum Duration and a Maximum Duration. The Duration test determines the duration of the current event by examining the current event providing the event start and stop times. The Duration of the event is calculated as the difference between the stop and start times. The resulting Duration is compared to the Minimum Duration and Maximum Duration parameters. The field incursion event is plausible if the calculated Duration is greater than the Minimum Duration parameter and less than the Maximum Duration parameter. Otherwise, the current event is determined to be not plausible.

The setting of the Minimum Duration and Maximum Duration parameters is directly related to the size of the object (as determined by the cross-section of the object in the detection field) and the rate at which it moves through the field.

Another plausibility test is the Low Pass Location (LP Loc) test. Parameters associated with LP Loc include Raw/Filtered sets of data, the number of events, a Time Window Maximum, a Time Window Minimum, a Location Distance Maximum and a Location Distance Minimum.

The LP Loc plausibility test operates on either raw or filtered data sets, as determined by the Raw/Filtered parameter. This test provides a low pass filtering mechanism with events selected from the chosen event data set for comparison purposes being determined by a time window around the current event and a distance window around the current event location.

Note that since this plausibility test is both backward and forward looking in time, processing of the plausibility test has to be delayed by the time window to ensure that all future events with respect to the current event have occurred prior to processing.

The decision surface of the plausibility filter in this example can be viewed as a spherical shell in a time/distance/location coordinate frame around the time/location at which the current XYZ/Time event occurs, with the inner diameters determined by the Time Window Minimum and Location Distance Minimum and the outer diameters determined by the Time Window Maximum and Location Distance Maximum.

The LP Loc plausibility test, looking forward/backward in time as related to the current event, counts all events that occurred more than Time Window Minimum and less than Time Window Maximum away from the time of the current event and also occurring more than Location Distance Minimum away and less than Location Distance Maximum away from the current event location. If the count of the number of qualifying events as determined above is equal to or greater than the Number of Incursions, the current event is considered to be not plausible. Otherwise, it is plausible. These parameters may be considered temporo-spatial parameters and may be in a configured range for a configured time and radius around the incursion location.

If an XYZ/Time signal 144 based event is found to be plausible, an Event Detection signal 134 indicating a plausible human body falling event detection has taken place is sent to the User Notification System 130 where the Event Detection signal 134 contents are used to notify users of the plausible event.

Detection Plane Orientation

Figure 5:
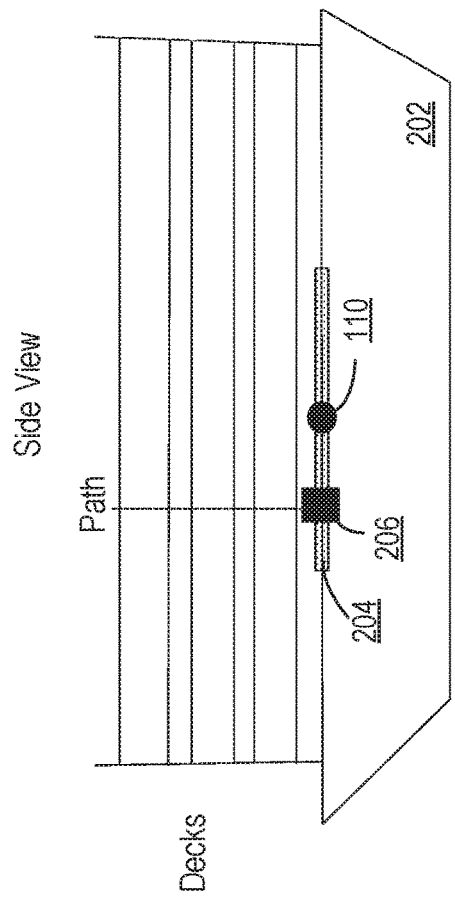
FIGS. 4-6 illustrate top, side and rear views of a ship that uses a single-plane rotational LIDAR unit with a horizontal orientation, according to some embodiments.
Figure 6:
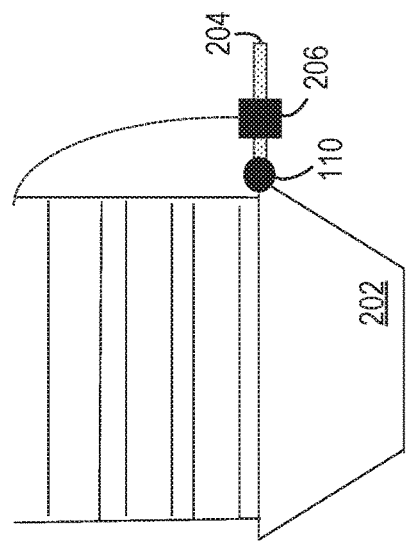
Figure 4:
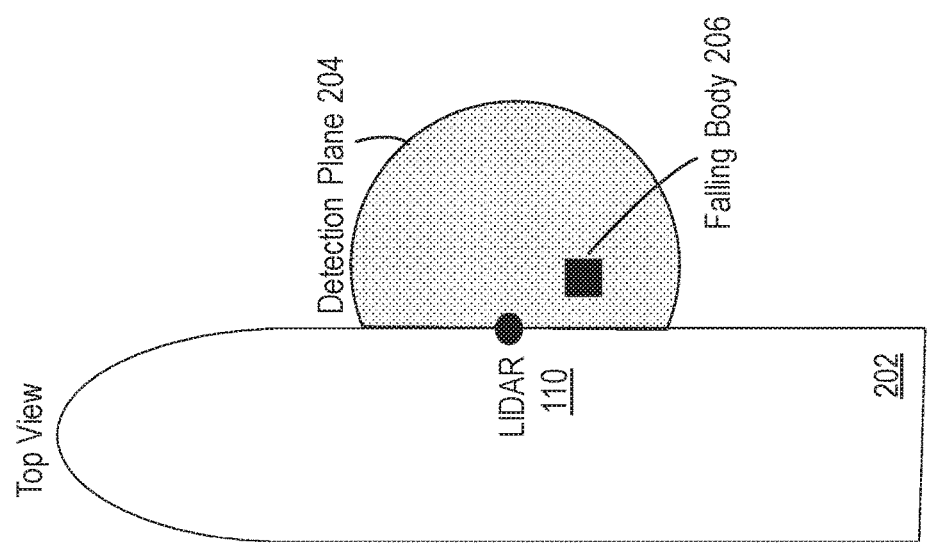

In embodiments that use a planar detection field, orienting the detection field perpendicular to the side of the structure represents a known mounting orientation due to the ease of mounting and the simplicity in determining the field incursion location in a two-dimensional space. For example, on a ship, a LIDAR device 110 might typically be mounted as shown in FIGS. 4-6. FIG. 4 shows a top view of a ship 202 with the mounted LIDAR device 110. The LIDAR device 110 detects objects within a detection plane 204. A falling body 206 may be detected as an incursion into this detection plane 204. FIG. 5 shows a side view of the ship 202, and FIG. 6 shows a rear view of the ship 202.

In the example shown by FIGS. 4-6, the LIDAR device 110 is mounted on the side of the ship 202 and proximate to the level of the main deck. Generally, the placements of the LIDAR devices may be close enough to an accessible deck area so that they can be cleaned and maintained, although they could be affected by curious or unwitting passengers. In some embodiments, the detection field is a two-dimensional plane that is horizontal when the marine vessel is level, and parameters for filtering are defined for a human body falling through a horizontal, two-dimensional plane from one or more configured heights or ranges of heights. In FIGS. 4-6, the LIDAR device's 110 detection field is a horizontal detection plane 204 through which the LIDAR device 110 scans for incursions.

However, it is recognized herein that, subject to any limitations imposed by the involved structure and the particular deployment, alternate mounting orientations provide both higher fidelity and additional information from both planar and volumetric LIDAR devices 110. Thus, in one aspect of the teachings herein, falling object detection systems employ alternate orientations that provide falling body discrimination improvements, both from individual LIDAR or sensing units and from combining information from multiple units. Broadly, orientation of the LIDAR device's detection fields can be understood as one element or aspect of the strategic "detection field configurations" contemplated herein.

Figure 7:
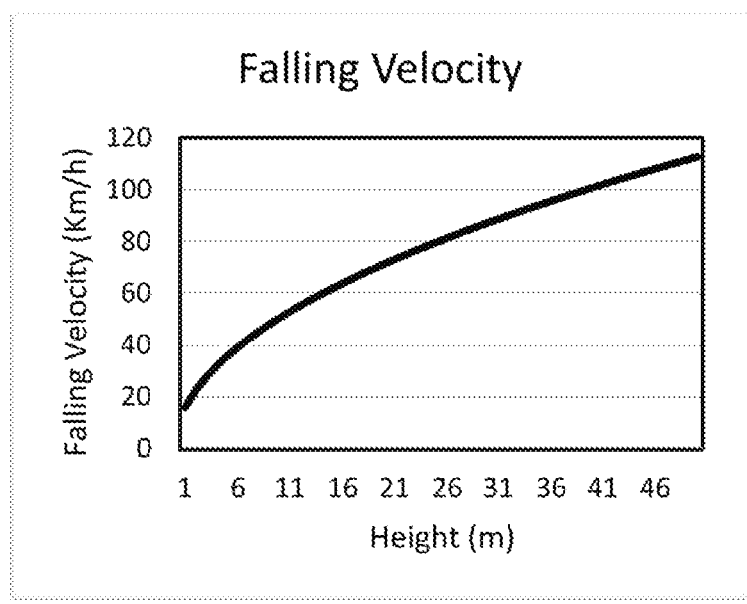
FIG. 7 is a line graph showing a falling velocity of an object.

For instance, FIGS. 4-6 show an example utilizing one single-plane rotational LIDAR device 110, but what seems like the obvious choice—the detection plane 204 oriented with the main deck of the ship 202—may be a less-effective orientation. In this case, the motion of the falling body is perpendicular to the detection plane 204, which minimizes time in the detection field and reduces the probability of detection. Typically, a falling body starting from a height of forty meters is travelling at a vertical speed of approximately 100 km/h by the time the falling body enters the detection plane 204. Falling speeds are reflected in the line graph shown in FIG. 7.

At 100 km/h, a planar LIDAR device rotating at 50 Hertz will detect a falling body with a minimum one-foot cross-sectional area to the detecting beam during only one scan, providing only a detection location and an inaccurate estimate of the time in the detection plane 204. In this case, scanning at 50 Hz, the time in the detection plane 204 is only known to be between 0 and 2 scans or 0<=t<40 milliseconds, where t is the time in the field and a single scan takes 20 milliseconds. Also, no information is directly available about the height from which the falling body originated, as the height of the detection field is a constant and there may not be enough information to directly calculate vertical velocity.

Figure 9:
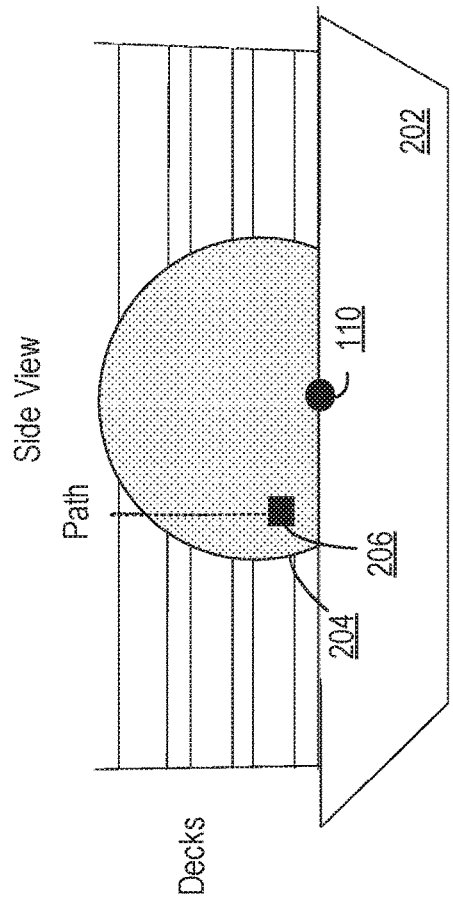
FIGS. 8-10 illustrate top, side and rear views of a ship that uses a single-plane rotational LIDAR unit with a vertical orientation, according to some embodiments.
Figure 10:
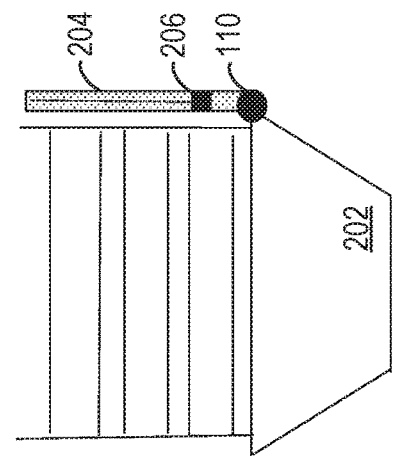
Figure 8:
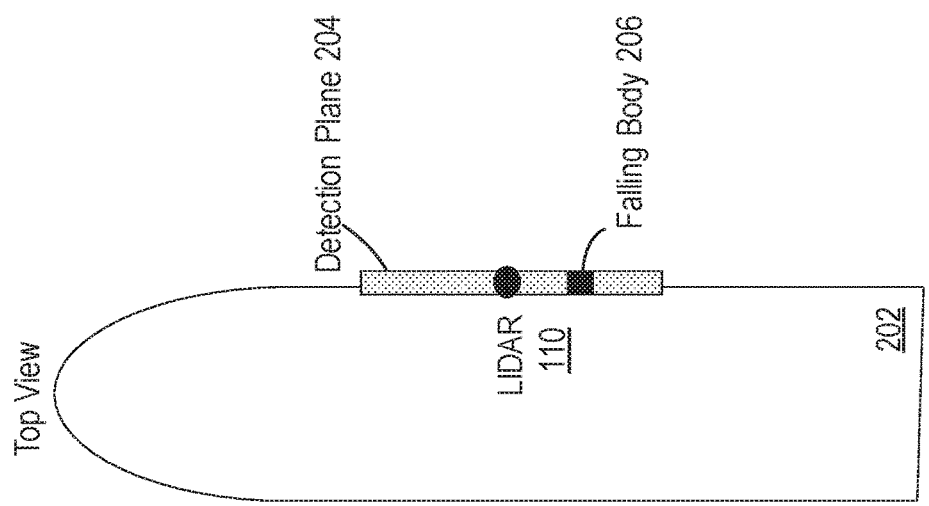

In another example, FIGS. 8-10 show top, side and rear views of the ship 202, such as in earlier FIGS. 4-6. However, the LIDAR device 110 in FIGS. 8-10 is mounted and configured so that the detection plane 204 is oriented vertically. A vertical orientation of the detection plane 204 can detect a falling body earlier and capture a falling body. In some embodiments, the detection field is a two-dimensional plane that is vertical when the marine vessel is level, and parameters for filtering are defined for a human body falling through a vertical, two-dimensional plane from one or more configured heights or ranges of heights.

Figure 11:
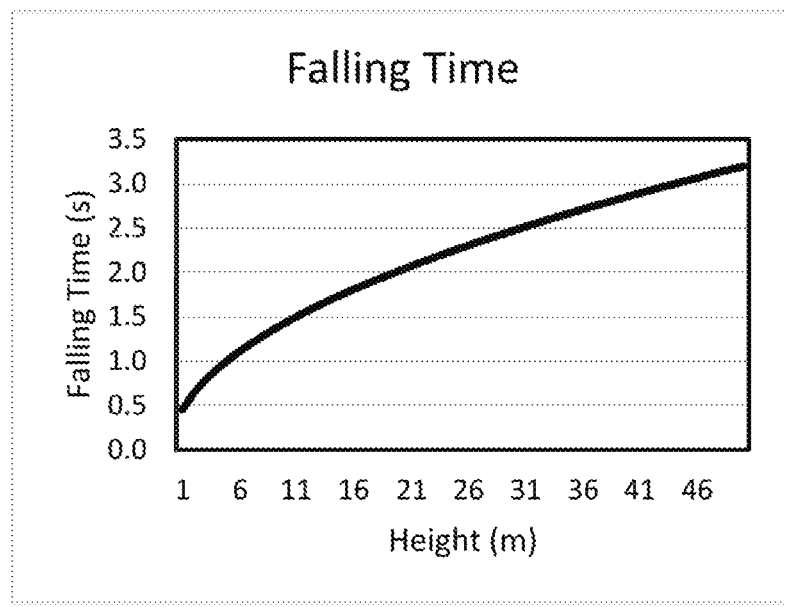
FIG. 11 is a line graph showing a falling time of an object.

A "vertical" orientation, which term encompasses "substantially" vertical, can lead to a falling body being in the detection plane 204 the maximum amount of time (the duration of the fall), provided that the falling body has little or no velocity away from the structure. Any velocity away from the structure would lead to the falling body leaving the detection plane 204. A falling body leaving the detection plane 204 would be an extreme, and perhaps impractical, case. However, the concept of horizontal travel does provide theoretical bounds or a configured range for time in the detection plane 204. In this case, an object falling from a height of 50 m falls for approximately 3.2 s. This is reflected in the falling time line graph shown in FIG. 11.

If the falling object remains in the detection plane 204 for the full falling time with the LIDAR unit 110 scanning at 50 Hz (20 milliseconds/scan), the total number of detections that will occur is 3.2 s/20 ms or 160 detections, each of which provides information (e.g., velocity, acceleration, cross sectional area, etc.) for improving the discrimination of interesting objects from non-interesting objects. That is, the orientation and increased detection time allows the processing apparatus 10 to develop more accurate parameters and/or a richer set of parameters for the field incursion, such as velocity, acceleration, and ballistic trajectory. More accurate parameters and/or more parameters provide for enhanced plausibility testing.

Figure 13:
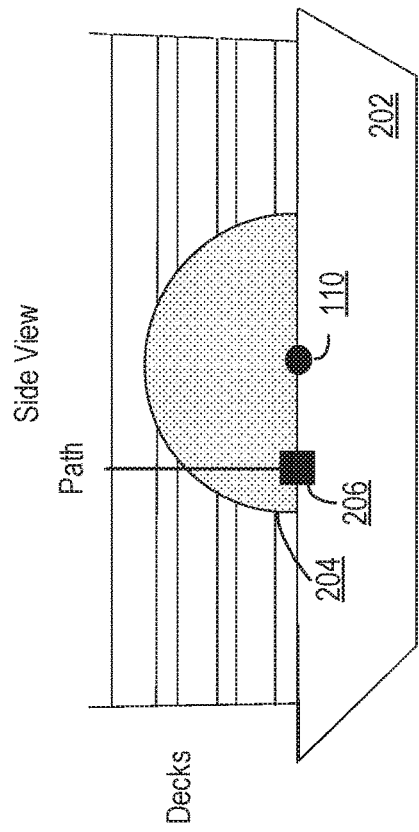
FIGS. 12-14 illustrate top, side and rear views of a ship that uses a single-plane rotational LIDAR unit with a 45-degree orientation (inclination), according to some embodiments.
Figure 14:
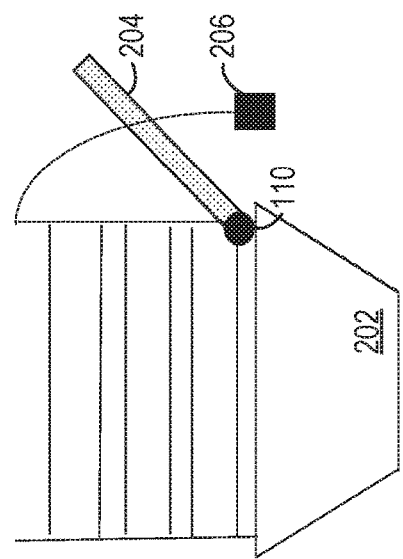
Figure 12:
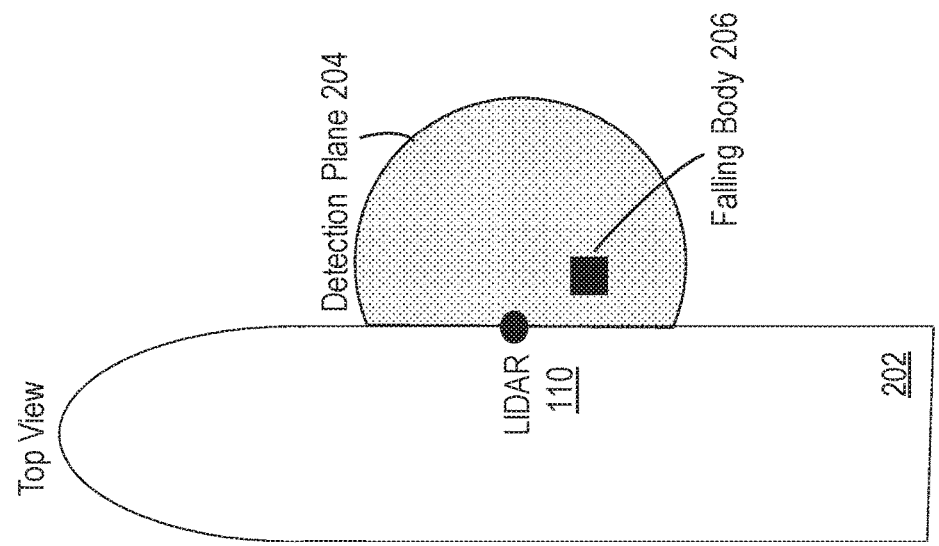

In another example, a compromise between the two extreme orientations is achieved by tilting the detection plane 204 at 45 degrees. FIGS. 12-14 show this tilted orientation. This provides some of the benefits of the vertical orientation, in terms of additional potential detections and providing height information. This also provides some of the benefits of the horizontal orientation, in terms of guaranteeing a field incursion when a body falls from the structure.

Accordingly, in some embodiments, the detection plane 204 is inclined from the horizontal when the marine vessel is level, and the parameters are defined for a human body falling through an inclined, two-dimensional plane from one or more configured heights or ranges of heights.

The optimal orientation may be determined on a case by case basis, as limited by the structure itself and by particular deployment requirements. An optimal orientation can be in between the vertical and horizontal orientations discussed above.

Figure 15:
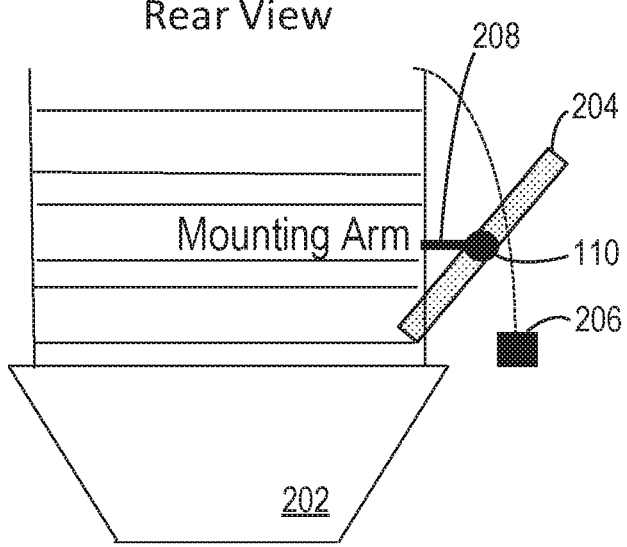
FIG. 15 illustrates a rear view of a ship with a LIDAR unit mounted further away from the ship, according to some embodiments.

Additionally, mounting locations other than below the lowest deck or human accessible area of the marine vessel become feasible as the detection plane 204 could be aligned to intersect the side of the ship 202 below the lowest possible egress point. This alignment could eliminate areas that could allow for egress without detection and allow for mounting in locations that ease maintenance of LIDAR systems (e.g., cleaning, testing, etc.). For example, FIG. 15 shows a LIDAR device 110 that is mounted with a mounting arm 208 extended from a higher deck.

Volumetric Scanning

In some embodiments, the detection field is a three-dimensional volume having a nominal envelope relative to the horizontal when the marine vessel is level, and the parameters are defined for a human body falling through a three-dimensional volume having the nominal envelope relative to the horizontal from one or more configured heights or ranges of heights.

Volumetric scanning provides a detection field that detects incursions within a 3D volume. This is typically achieved in two ways. One way is using multiple detection planes, oriented, to detect incursions on the planes either separated by an angular or vertical displacement. This approach provides for detection at discrete points in the 3D space intersected by the detection planes 204.

Another way involves the general ability to direct a detection beam (laser in the case of LIDAR) through a line in the detection space, detecting all incursions where the line intersects the 3D space. While in that position, the detecting beam is directed to another location in space irrespective of the original location. This directionality is typically achieved through beam-steering mechanisms.

In both cases, a sampling of the 3D space is achieved at varying degrees of fidelity, based on rotational rates, the number of planes, how rapidly a beam can be steered or the acquisition time. As part of this transformation, multiple detections from the same unit or other units, depending on the orientation of units and detection fields, can be used to estimate the arc followed by the falling body. This arc estimation can be used to estimate the point (e.g., deck/room) from which the falling body originated.

With the 3D information from volumetric scanning, additional information for discriminating between falling bodies of interest and those not of interest can be calculated according to configured ranges for relative parameters. This information can be applied as additional plausibility tests, further improving the discrimination process. This information can include, but is not limited to, information about the acceleration, the velocity and/or the ballistic curve of a falling body.

With regard to acceleration, a falling body should accelerate at the rate of gravity minus air resistance reductions to the acceleration. If sufficient detections are available to calculate acceleration with acceptable fidelity, the detected acceleration can be compared to the anticipated acceleration (gravity minus air resistance) as a plausibility test. For example, air resistance could have less effect on a human body than a piece of clothing.

Velocity away from the marine vessel is a constant velocity minus air resistance. Velocity downward, perpendicular to the water, should increase based on acceleration minus air resistance. If either velocity falls outside a configured range of plausible values, as determined by parameters configured for a given deployment, the incursion would not pass this plausibility test. For example, the parameters could be based on the fastest any person could be expected to jump horizontally away from a boat and the slowest and fastest plausible vertical speeds based on the height of the structure and the lowest height above the LIDAR device 110.

Ballistic curves (trajectories) for certain objects can be estimated using acceleration, velocity, and anticipated levels of air resistance. The ballistic curve estimate can be adjusted for wind speed/direction and ship speed/direction, if available. Detected incursion points of a detection event each have a 3D location and an incursion time. If these detected incursion points sufficiently fit a ballistic curve estimate, based upon a configured range of parameters and the projected egress point, the detection event could pass the plausibility test. The origin point of the body could also be projected based on how the ballistic trajectory curve fits to the detected incursion points.

Figure 17:
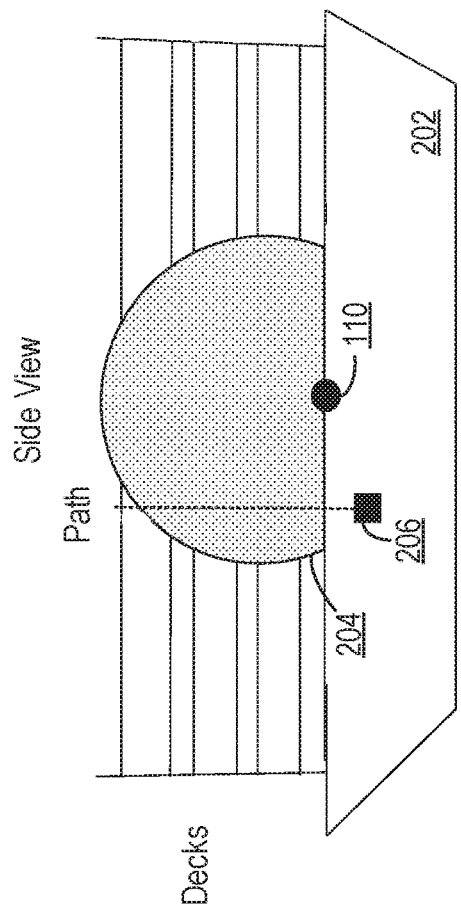
FIGS. 16-18 illustrate top, side and rear views of a ship that uses a single-plane rotational LIDAR unit configured to scan multiple detection planes, according to some embodiments.
Figure 18:
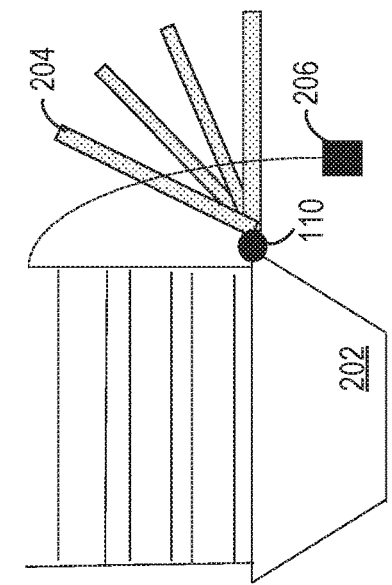
Figure 16:
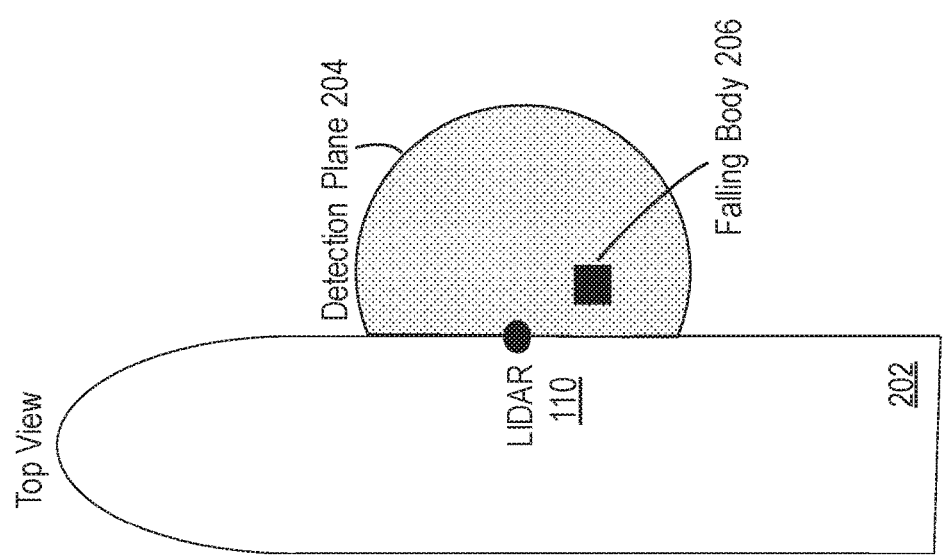

In a multi-plane volumetric scanner, a minimum of two single plane detection fields are stacked and separated vertically, angularly, or both, in a known orientation with incursions detected in each plane. FIGS. 16-18 illustrate an example with multiple detection planes 204.

Based on multiple detections taking place for every falling object (one or more for each detection plane 204), the collection of detected incursion points can be used to estimate the parameters of a ballistic trajectory for the object. These parameters may include velocity, acceleration, and origination point. If these parameters are found to be within the configured tolerance limits or range (along with the appropriate cross-sectional size), the object passes this plausibility test.

According to some embodiments, parameters for a plausibility test include a falling-object velocity and a falling-object acceleration derived from the detection signaling. The determination of whether the parameters fall within configured ranges that are plausible for a human being falling from the marine vessel through the detection field then includes calculating a ballistic trajectory by curve fitting detected incursion points associated with the field incursion as a function of the falling-object velocity and the falling-object acceleration, and determining whether the ballistic trajectory is plausible for a human being falling from the marine vessel through the detection field.

In other embodiments, an object's detected position at a given times is utilized to derive a falling-object position, a falling-object velocity and/or a falling-object acceleration from the detection signaling as the parameters, and determining whether the parameters fall within configured ranges that are plausible for a human body falling from the marine vessel through the detection field includes computing a ballistic trajectory from the falling-object positions, the falling-object velocity and/or the falling-object acceleration, and comparing the computed ballistic trajectory to one or more plausible ballistic trajectories.

Figure 19:
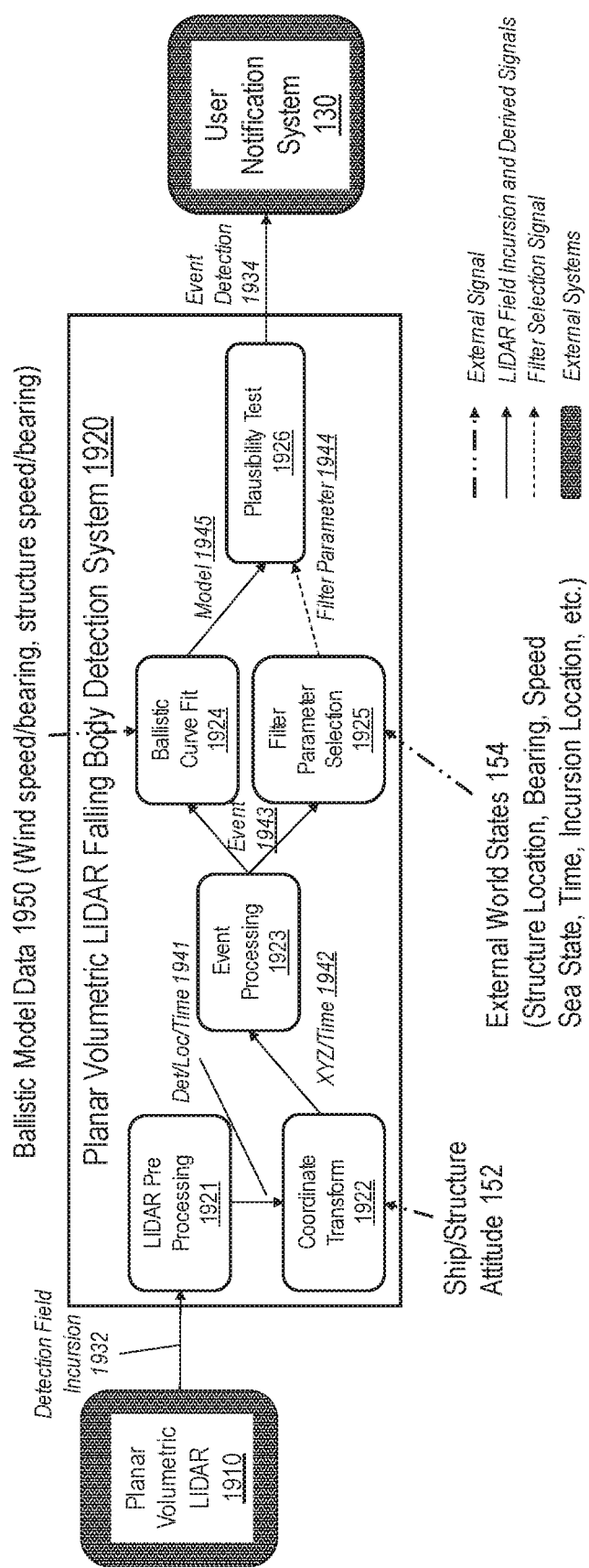
FIG. 19 illustrates a LIDAR-based falling body detection system, according to some embodiments.

An example system for using plausibility tests with volumetric scanning is shown in FIG. 19 and further detailed below. A Planar Volumetric LIDAR device 1910 sends a Detection Field Incursion signal 1932 to the LIDAR Pre-Processing element 1921 in the planar volumetric LIDAR Falling Body Detection System (LFBDS) 1920, which may be implemented via the processing apparatus 10, for example. While the Detection Field Incursion signal 1932 can include many types of data and encodings based on the selected vendor for the Planar Volumetric LIDAR device 1910, the signal 1932 contents fall into two broad categories.

In a first category, detection field incursion notifications, which are generated by the Planar Volumetric LIDAR device 1910 when a reflection of sufficient strength or size is detected in any scanned plane, generally include: a plane identification (or plane angle from horizontal relative to unit); a radial distance to object causing reflection; an in-plane angle of a laser when an object is detected; and a time of detection.

In another category, point cloud data is sent as each point is collected in space, indicating the presence or absence of a reflection for all points scanned. Point cloud data may include: the presence or absence of a reflection or the strength of a reflection; a plane identification (or plane angle from horizontal relative to unit); a radial distance to object causing reflection or null if no reflection; an in-plane angle of laser: and/or a time of detection.

Continuing with the process shown in FIG. 19, the LIDAR Pre-Processing element 1921 receives the Detection Field Incursion signal 1932 and performs the pre-processing required, based on the data/format provided by the LIDAR device 1910. The LIDAR Pre-Processing element 1921 converts the LIDAR data from a vendor specific format to a normalized format containing detection information (size, reflectivity, etc.), a location relative to the unit, and the time of the incursion. In the case of the first category discussed above, this includes decoding vendor specific information. In the case of the second category, the point cloud data is converted to the normalized format by processing each point as it becomes available, to determine if an object has been detected. If an object has been detected, the size, location and/or time of the detection are determined. In both categories, the result is the Det/Loc/Time signal 1941, which contains normalized data indicating the detection size, the location relative to the unit, and the time of the detection.

The Det/Loc/Time signal 1941 from the Pre-Processing element 1921 to the Coordinate Transform element 1922 causes the location information in the Det/Loc/Time signal 1941 to be transformed from the reference frame of the unit to the reference frame of the structure (e.g., a ship). If the alignment of the originating structure (e.g., ship deck) can change significantly as related to the direction of the acceleration of the falling body, the Coordinate Transform element 1922 corrects for these changes based on the Ship/Structure Attitude signal 152. The resulting signal, XYZ/Time signal 1942, contains detection information related to the size of the object, the location as referenced to the structure, and the time of the detection.

Upon receiving the XYZ/Time signal 1942, the Event Processing element 1923 stores the information about the detection. Based on the maximum falling time of a human body falling from the highest point on the structure and the locations of the detections, groups point into an event, where an event is defined to be the group of detections associated with a potential falling body as detected by one or more LIDAR units 1910.

Once an event has been created, the Event signal 1943 is sent to the Ballistic Curve Fit element 1924, which takes the supplied points and attempts to fit them to a ballistic curve associated with a falling body. Note that, if available, the Ballistic Curve Fit element 1924 takes into account wind speed/bearing that would affect a falling body decoupled from the structure and structure speed/bearing that would affect initial velocities/acceleration.

The result of the ballistic curve fit produces several parameters including those that include the Model signal 1945. These parameters include: an initial horizontal velocity of the falling body relative to the structure; an initial vertical velocity of the falling body relative to the structure; a horizontal acceleration of the falling body; a vertical acceleration of the falling body; a point of origin of the falling body relative to the structure and/or a quality measure of the ballistic curve fit.

The Filter Parameter Selection element 1925 receives the External World States signal 154 and the Event signal 1943 to determine the set of parameters used in the Plausibility Test element 1926 based on user configured system variables. The External World States signal 154 provides information related to world states external to the system, including such things as, but not limited to: an incursion location; an incursion origination: an incursion time; an incursion duration; a structure location (in the case of moving structures such as a ship); a structure bearing; a structure speed; a sea state (in the case of a structure on a body of water): a structure time; an event schedule; and a passenger complement.

The Event signal 1943 is used in determining the Plausibility Test element 1926 using information such as, but not limited to: a number of points in event which can be used to adjust the required quality of the curve fit; a location of an event: and/or the total time of an event.

The Filter Parameter signal 1944 is then sent to the Plausibility Test element 1926. This signal contains configuration ranges, including: limits for initial horizontal/vertical velocities; 3D axis limits for plausible originating locations; time limits for event duration; limits for horizontal/vertical accelerations: limits for size of detected object; and/or a minimum acceptable quality measure of ballistic curve fit.

Upon receiving the Model signal 1945 and the Filter Parameter signal 1944, the Plausibility Test element 1926 compares the calculated values in the Model signal 1945 to the limits in the Filter Parameter signal 1944. If all parameters are within the ranges specified, the falling body is considered to be plausible. At this point, additional plausibility tests could be performed or, if no other tests are to be performed, the Event Detection signal 1934 is sent notifying users that a plausible falling body detection has taken place.

Beam-Steered Approach

Figure 20:
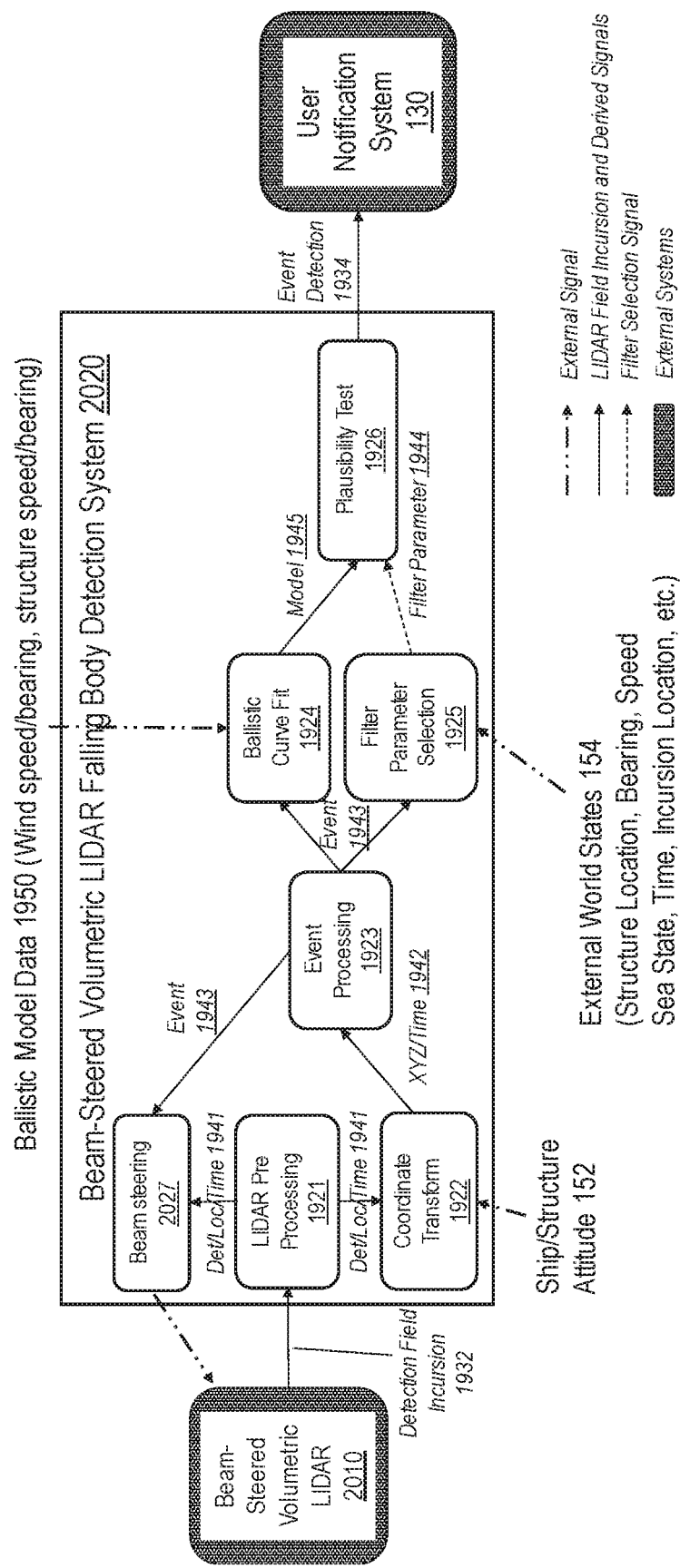
FIG. 20 illustrates a LIDAR-based falling body detection system, according to some embodiments.

In a beam-steered LIDAR planar-volumetric FBDS 2020, illustrated in FIG. 20, the laser beam is steered to a selected position without regard to the previous position. This is usually through a non-mechanical steering mechanism. In this type of system, unlike in a multi-planar system, upon detecting an incursion, the beam can be steered to optimize detections. For example, once an incursion is detected in the upper part of the volume being scanned, general scanning of the volume can be interrupted with the beam steered to likely locations where the next detection would occur given a ballistic trajectory of the object.

The beam-steered volumetric FBDS 2020 is largely identical to the planar volumetric FBDS device 1920, with the addition of a Beam Steering module 2027. As with the FBDS 1920, the FBDS 2020 may be implemented via the processing apparatus 10.

The Beam Steering module 2027 receives the Det/Loc/Time signal 1941 and the Event signal 1943 and evaluates a cost function to determine if the general volume scanning being performed by the beam-steered volumetric LIDAR device 2010 should be modified to scan areas where, given a ballistic trajectory of a detected incursion, the next scannable point in the ballistic path would likely be located. If acquiring additional scan data would likely improve the ballistic model sufficiently to justify not scanning other areas briefly, and if it is feasible given the current detection state of the LIDAR device 2010, the device 2010 would be steered to scan in the area of the point, in preference to general scanning. This may also be dependent on whether there is time to steer the beam to the selected point and to acquire the scanning information. The determination of what time is available is based on the projected arrival time of the object at the scannable point. This would result in detecting the object at additional points/times that would not normally be available in a non-steered system.

As the object is detected at additional points or not detected, the same cost function would be applied to determining if the device 2010 should once again be diverted from general volume scanning to the area an object is expected to pass through. As more points in the ballistic trajectory are verified or not verified, the additional accuracy of the ballistic model will decline in value relative to the cost of diverting the general scan, eventually resulting in the return to general volume scanning. A detection field incursion signal 1932 is sent from the beam-steered volumetric LIDAR device 2010 and the Beam-Steered Volumetric LIDAR FBDS 2020 proceeds with relevant plausibility tests for detected incursions.

Additional Considerations

LIDAR device types could include LIDAR devices configured for rotational scanning, fixed plane continuous scanning, and/or volumetric scanning. Examples include SICK (single plane rotational), LEDDAR (single plane continuous), Volumetric Multi Plane Rotational (Velo PUCK), and Volumetric Beam Steered (Quanergy S3).

In a sparse detection field (e.g., under normal conditions, no reflections), no foreground extraction necessary and exceptions include gangway, dock, birds, boats, cleaning, passenger interference, debris, trash which are not considered a falling body of interest.

There may be limited data due to the speed of an object as it passes through detection field (initial velocity zero to 60 mph). Often, this includes a single detection period, which prevents the classifying of an object based on repeated scans, an object profile and/or movement within the sensory or detection field.

Object profile based categorization may be difficult due to potential orientations/sizes of falling body of interest and associated cross sectional changes. Additionally, due to the small cross-sectional size relative to the potential distance from a LIDAR unit, it may be difficult to accurately characterize the size of an object entering the detection field.

Additional Embodiments

In another embodiment, a method performed by the processing apparatus 10 includes receiving detection signaling from an object-detection device indicating an incursion of an object into a detection field of the object-detection device (e.g., LIDAR device), the object-detection device being oriented to detect objects within a space alongside a vertical structure (e.g., ship). The method also includes obtaining detection metrics (one or more parameters, such as object size, duration of detection or speed, etc.) from the detection signaling and identifying the incursion as a fall event, based on determining that the detection metrics (parametric values) are within configured ranges that are characteristic for objects of a defined class falling from the vertical structure through the detection field of the object-detection device. The method further comprises outputting fall-event signaling responsive to the fall event, to initiate one or more alarms or control actions taken in response to fall events.

The defined class is, for example, human beings (e.g., an assumed range of sizes plausible for a human body) and fall events of interest are those field incursions that have passed the applied plausibility testing. As before, plausibility testing may include determining whether the detection metrics fall within configured ranges that are characteristic of a human body falling from the marine vessel through the detection field. Note that these configured ranges may reflect, for example, the specific layout of the marine vessel in relation to the detection field, e.g., such as the height or heights of possible egress locations-points from which a person could fall overboard-along with any applicable considerations of horizontal offset, etc., that influence the expected trajectory of a human body upon reaching or passing through the detection field.

In some cases, the processing apparatus 10 forms part of or communicatively couples to a video management system, where outputting the fall-event signaling includes outputting control signaling to the video management system to initiate retrieval and display of video data corresponding to the fall event. The method may further include determining a time window overlapping with the fall event and identifying one or more video sources having fields of view associated with the object-detection device. The outputting of the control signaling to the video management system would then include outputting control signaling to initiate retrieval and display of the video data corresponding to the time window and the identified one or more video sources.

The detection metrics (parameters) may include any combination of the following items for the object: a velocity metric, an acceleration metric, a shape metric, a size metric, a location metric expressed in relation to the object-detection device or the vertical structure, and a trajectory metric. Determining that the detection metrics fall within the configured ranges that are characteristic for objects of the defined class falling from the vertical structure through the detection field of the object-detection device may then include determining that the velocity metric falls within a defined range of velocities that are possible with respect to the vertical structure. The detection signaling may indicate an incursion start and an incursion end, and the method may further include determining the velocity metric based the time between the incursion start and the incursion end and known shape and orientation characteristics of the detection field.

In some cases, obtaining the detection metrics includes, for one or more detection metrics, deriving the one or more detection metrics in dependence on how long the object was present in the detection field, as determined from the detection signaling. In other cases, obtaining the detection metrics includes, for one or more detection metrics, deriving the one or more detection metrics in dependence on a path followed by the object through the detection field of the object-detection device.

Determining that the detection metrics are within configured ranges may include verifying that any combination of detected object size, shape, acceleration, velocity, and trajectory, are consistent with corresponding values characteristic of a human body falling or jumping from known heights or locations associated with the vertical structure.

The object-detection device may be one of two or more object-detection devices having respective detection fields oriented in overlapping or complementing arrangements within the space alongside the vertical structure, the step of receiving the detection signaling may include receiving respective detection signaling from respective ones of the two or more object-detection devices, and the step of obtaining the decision metrics may include obtaining the detection metrics in joint consideration of the respective detection signaling from the respective ones of the two or more object-detection devices.

Identifying the incursion as a fall event—i.e., a plausible person overboard event-further may include verifying that the incursion is a distinct incursion event. Verifying that the incursion is a distinct incursion event may include at least one of: determining that the incursion is temporally distinct, and determining that the incursion is spatially distinct. Verifying that the incursion is a distinct incursion event may also include determining that one or more earlier or later incursion events were not or are not detected within a same space or area of the detection field.

The configured ranges may be configured based on receiving and evaluating detection signaling from the LIDAR unit corresponding to training events in which objects mimicking or matching physical characteristics of objects belonging to the defined class of objects are dropped or pushed from varying points on the vertical structure. The configured ranges may be configured by determining characteristic ranges from the training events, for any one or more of: detected object size, shape, acceleration, velocity, and trajectory.

The method may include selectively operating the processing apparatus in training mode, such that characteristic values are recorded for falling objects that mimic or match physical characteristics of objects of the defined class of objects of interest and originate from varying points on the vertical structure, and generating the configured ranges based on the characteristic values recorded in the training mode.

The placement, position, and orientation of one or more object-detection devices having respective detection fields oriented in overlapping or complementing arrangements within the space alongside the vertical structure may be configured to enhance the detection capabilities for one or more of the object size, shape, acceleration, velocity, and trajectory.

The vertical structure may include a fixed structure or a movable structure. The vertical structure may also include a building, a tower, a bridge, construction equipment, a well, an onshore drilling rig, or an offshore drilling rig, boat, or other marine vessel. The position and movements of the vertical structure may be measured and used to compensate the detected metrics or the configured ranges. Measured movements of the vertical structure may include one or more of: position, direction, velocity, acceleration, rotational change, vibration, and sway along any one or multiple axial planes of the vertical structure.

The method may further include determining the configured ranges or overriding the fall-event signaling in dependence on at least one of: a geographic location of the vertical structure; whether the structure is stationary or moving; a position or orientation of the vertical structure relative to another structure; and information received by the processing apparatus 10 indicating how the configured ranges should be configured.

The frequency and position of incursion detections in relation to the frequency, position, and classification of one or more previous or later incursion detections may be used by the processing apparatus 10 to determine a validity of falling object classification and/or the need to report the falling object and override the outputting fall-event signaling. Classifications of previous incursion detections used in determining validity or need of reporting may include detections deemed to be both fall-events and non-fall events.

In some embodiments, the processing apparatus 10 is configured to perform the methods described in this section. For example, the interface circuitry 20 of the processing apparatus 10 may be configured to receive detection signaling from an object-detection device indicating an incursion of an object into a detection field of the object-detection device, the object-detection device being oriented to detect objects within a space alongside a vertical structure. The processing circuitry 30 may be configured to obtain detection metrics from the detection signaling and identify the incursion as a fall event, based on determining that the detection metrics fall within configured ranges that are characteristic for objects of a defined class falling from the vertical structure through the detection field of the object-detection device. The processing circuitry 30 may be configured to output fall-event signaling responsive to the fall event, to initiate one or more alarms or control actions taken in response to fall events.

In some cases, the processing apparatus 10 comprises a computer configured as a video management system, where the video management system is operatively associated with one or more video sources having fields of view corresponding to the object-detection device, and the fall-event signaling is operative to initiate playout of video data from the one or more video sources corresponding to a time window encompassing the fall event.

In other embodiments, the processing apparatus 10 includes communication circuitry configured to receive volumetric scanning data from one or more volumetric scanners positioned to perform volumetric scanning in a space alongside a vertical structure and processing circuitry operatively associated with the communication circuitry and configured to detect object incursions representing fall events of interest, based on evaluating the volumetric scanning data.

For the method and apparatus embodiments in this section, the object-detection devices referred to as sensing or sensor units may be LIDAR-based detection devices.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a processing apparatus, the method comprising:
   receiving detection signaling indicating a field incursion in a detection field of a light detection and ranging (LIDAR) device, the LIDAR device being mounted to a marine vessel and oriented to detect objects within a free space alongside the marine vessel;
   applying plausibility testing to the field incursion, including determining whether parameters derived from the detection signaling are characteristic of a human body falling from the marine vessel through the detection field; and
   outputting signaling indicating a person overboard event to an alarm or control system onboard the marine vessel, in response to the field incursion passing the plausibility testing;
   wherein applying the plausibility testing to the field incursion includes applying a temporo-spatial filtering test to determine whether the field incursion is distinct, the temporo-spatial filtering test comprising determining, for a defined time window around a detection time of the field incursion, the number of other field incursions detected within a configured area or volume around a location of the field incursion in the detection field, and wherein the field incursion passes the temporo-spatial filtering test if the number is less than a configured number, and otherwise fails the temporo-spatial filtering test.

2. A method performed by a processing apparatus, the method comprising:
   receiving detection signaling indicating a field incursion in a detection field of a light detection and ranging (LIDAR) device, the LIDAR device being mounted to a marine vessel and oriented to detect objects within a free space alongside the marine vessel;
   applying plausibility testing to the field incursion, including determining whether parameters derived from the detection signaling are characteristic of a human body falling from the marine vessel through the detection field; and
   outputting signaling indicating a person overboard event to an alarm or control system onboard the marine vessel, in response to the field incursion passing the plausibility testing;
   wherein determining whether the parameters are characteristic of a human body falling from the marine vessel through the detection field comprises determining whether the parameters fall within configured ranges that are plausible for a human body falling from the marine vessel through the detection field;
   wherein the method further comprises, before determining whether the parameters fall within the configured ranges, performing at least one of:
     compensating the parameters for motion of the marine vessel coincident with the field incursion; and
     compensating the configured ranges for motion of the marine vessel coincident with the field incursion; and
     wherein the parameters are derived from the detection signaling, and wherein compensating the parameters comprises changing the parameters to account for the motion of the marine vessel relative to a falling object assumed to be responsible for the field incursion.

3. A method performed by a processing apparatus, the method comprising:
   receiving detection signaling indicating a field incursion in a detection field of a light detection and ranging (LIDAR) device, the LIDAR device being mounted to a marine vessel and oriented to detect objects within a free space alongside the marine vessel;
   applying plausibility testing to the field incursion, including determining whether parameters derived from the detection signaling are characteristic of a human body falling from the marine vessel through the detection field; and
   outputting signaling indicating a person overboard event to an alarm or control system onboard the marine vessel, in response to the field incursion passing the plausibility testing;
   wherein determining whether the parameters are characteristic of a human body falling from the marine vessel through the detection field comprises determining whether the parameters fall within configured ranges that are plausible for a human body falling from the marine vessel through the detection field; and
   wherein the parameters comprise a falling-object position, a falling-object velocity and a falling-object acceleration derived from the detection signaling, and wherein determining whether the parameters fall within configured ranges that are plausible for a human being falling from the marine vessel through the detection field comprises calculating a ballistic trajectory by curve fitting detected incursion points associated with the field incursion as a function of the falling-object position, the falling-object velocity and the falling-object acceleration, and determining whether the ballistic trajectory is plausible for a human being falling from the marine vessel through the detection field.

4. A method performed by a processing apparatus, the method comprising:

receiving detection signaling indicating a field incursion in a detection field of a light detection and ranging (LIDAR) device, the LIDAR device being mounted to a marine vessel and oriented to detect objects within a free space alongside the marine vessel;

applying plausibility testing to the field incursion, including determining whether parameters derived from the detection signaling are characteristic of a human body falling from the marine vessel through the detection field; and outputting signaling indicating a person overboard event to an alarm or control system onboard the marine vessel, in response to the field incursion passing the plausibility testing;

wherein determining whether the parameters are characteristic of a human body falling from the marine vessel through the detection field comprises determining whether the parameters fall within configured ranges that are plausible for a human body falling from the marine vessel through the detection field; and wherein the method includes utilizing an object's detected position at a given time and deriving at least one of a falling-object position, a falling-object velocity and a falling-object acceleration from the detection signaling as the parameters, and wherein determining whether the parameters fall within configured ranges that are plausible for a human being falling from the marine vessel through the detection field comprises computing a ballistic trajectory from the at least one of the falling-object position, the falling-object velocity and the falling-object acceleration, and comparing the computed ballistic trajectory to one or more plausible ballistic trajectories.

5. A method performed by a processing apparatus, the method comprising:

receiving detection signaling indicating a field incursion in a detection field of a light detection and ranging (LIDAR) device, the LIDAR device being mounted to a marine vessel and oriented to detect objects within a free space alongside the marine vessel;

applying plausibility testing to the field incursion, including determining whether parameters derived from the detection signaling are characteristic of a human body falling from the marine vessel through the detection field; and outputting signaling indicating a person overboard event to an alarm or control system onboard the marine vessel, in response to the field incursion passing the plausibility testing;

wherein the detection signaling indicates object position at respective detection times, and wherein the method includes deriving the parameters from the indicated object position at the respective times and determining a ballistic trajectory from the parameters, and wherein applying the plausibility testing to the field incursion comprises determining whether the ballistic trajectory is plausible for a human body falling from the marine vessel through the detection field.

6. A processing apparatus comprising:

interface circuitry configured to receive detection signaling indicating a field incursion in a detection field of a light detection and ranging (LIDAR) device, the LIDAR device being mounted to a marine vessel and oriented to detect objects within a free space alongside the marine vessel; and processing circuitry operatively associated with the interface circuitry and configured to:

apply plausibility testing to the field incursion, including determining whether parameters derived from the detection signaling are characteristic of a human body falling from the marine vessel through the detection field; and output signaling indicating a person overboard event to an alarm or control system onboard the marine vessel, in response to the field incursion passing the plausibility testing;

wherein the processing circuitry is configured to apply, as part of the plausibility testing, a temporo-spatial filtering test to determine whether the field incursion is distinct, the temporo-spatial filtering test comprising determining, for a defined time window around a detection time of the field incursion, the number of other field incursions detected within a configured area or volume around a location of the field incursion in the detection field, and wherein the field incursion passes the temporo-spatial filtering test if the number is less than a configured number, and otherwise fails the temporo-spatial filtering test.

7. A processing apparatus comprising:

interface circuitry configured to receive detection signaling indicating a field incursion in a detection field of a light detection and ranging (LIDAR) device, the LIDAR device being mounted to a marine vessel and oriented to detect objects within a free space alongside the marine vessel; and processing circuitry operatively associated with the interface circuitry and configured to:

apply plausibility testing to the field incursion, including determining whether parameters derived from the detection signaling are characteristic of a human body falling from the marine vessel through the detection field; and output signaling indicating a person overboard event to an alarm or control system onboard the marine vessel, in response to the field incursion passing the plausibility testing;

wherein the processing circuitry is configured to determine whether the parameters are characteristic of a human body falling from the marine vessel through the detection field by determining whether the parameters fall within configured ranges that are plausible for a human body falling from the marine vessel through the detection field;

wherein, before determining whether the parameters fall within the configured ranges, the processing circuitry is configured to perform at least one of:

compensating the parameters for motion of the marine vessel coincident with the field incursion; and compensating the configured ranges for motion of the marine vessel coincident with the field incursion; and wherein the parameters are derived from the detection signaling, and wherein compensating the parameters comprises changing the parameters to account for the motion of the marine vessel relative to a falling object assumed to be responsible for the field incursion.

8. A processing apparatus comprising:
interface circuitry configured to receive detection signaling indicating a field incursion in a detection field of a light detection and ranging (LIDAR) device, the LIDAR device being mounted to a marine vessel and oriented to detect objects within a free space alongside the marine vessel; and
processing circuitry operatively associated with the interface circuitry and configured to:
   apply plausibility testing to the field incursion, including determining whether parameters derived from the detection signaling are characteristic of a human body falling from the marine vessel through the detection field; and
   output signaling indicating a person overboard event to an alarm or control system onboard the marine vessel, in response to the field incursion passing the plausibility testing;
wherein the processing circuitry is configured to determine whether the parameters are characteristic of a human body falling from the marine vessel through the detection field by determining whether the parameters fall within configured ranges that are plausible for a human body falling from the marine vessel through the detection field; and
wherein the parameters comprise a falling-object position, a falling-object velocity and a falling-object acceleration derived from the detection signaling, and wherein the processing circuitry is configured to determine whether the parameters fall within configured ranges that are plausible for a human body falling from the marine vessel through the detection field by calculating a ballistic trajectory by curve fitting detected incursion points associated with the field incursion as a function of the falling-object position, the falling-object velocity and the falling-object acceleration, and determining whether the ballistic trajectory is plausible for a human body falling from the marine vessel through the detection field.

9. A processing apparatus comprising:
interface circuitry configured to receive detection signaling indicating a field incursion in a detection field of a light detection and ranging (LIDAR) device, the LIDAR device being mounted to a marine vessel and oriented to detect objects within a free space alongside the marine vessel; and
processing circuitry operatively associated with the interface circuitry and configured to:
   apply plausibility testing to the field incursion, including determining whether parameters derived from the detection signaling are characteristic of a human body falling from the marine vessel through the detection field; and
   output signaling indicating a person overboard event to an alarm or control system onboard the marine vessel, in response to the field incursion passing the plausibility testing;
wherein the processing circuitry is configured to determine whether the parameters are characteristic of a human body falling from the marine vessel through the detection field by determining whether the parameters fall within configured ranges that are plausible for a human body falling from the marine vessel through the detection field; and
wherein the processing circuitry is configured to utilize an object's detected position at a given time and derive at least one of a falling-object position, a falling-object velocity and a falling-object acceleration from the detection signaling as the parameters, and determine whether the parameters fall within configured ranges that are plausible for a human being falling from the marine vessel through the detection field by computing a ballistic trajectory from the at least one of the falling-object position, the falling-object velocity and the falling-object acceleration, and comparing the computed ballistic trajectory to one or more plausible ballistic trajectories.

10. A processing apparatus comprising:
interface circuitry configured to receive detection signaling indicating a field incursion in a detection field of a light detection and ranging (LIDAR) device, the LIDAR device being mounted to a marine vessel and oriented to detect objects within a free space alongside the marine vessel; and
processing circuitry operatively associated with the interface circuitry and configured to:
   apply plausibility testing to the field incursion, including determining whether parameters derived from the detection signaling are characteristic of a human body falling from the marine vessel through the detection field; and
   output signaling indicating a person overboard event to an alarm or control system onboard the marine vessel, in response to the field incursion passing the plausibility testing;
wherein the detection signaling indicates object position at respective detection times, and wherein the processing circuitry is configured to derive the parameters from the indicated object position at the respective times and determine a ballistic trajectory from the parameters, and wherein the processing circuitry is configured to apply the plausibility testing to the field incursion by determining whether the ballistic trajectory is plausible for a human body falling from the marine vessel through the detection field.

\* \* \* \* \*